United States Patent
Shi et al.

(10) Patent No.: US 9,426,751 B2
(45) Date of Patent: Aug. 23, 2016

(54) METHODS AND NETWORK NODES FOR IMPROVING OLPC FUNCTIONALITY FOR HSUPA MIMO

(71) Applicant: Telefonaktiebolaget L M Ericsson (publ), Stockholm (SE)

(72) Inventors: Nianshan Shi, Järfälla (SE); Erik Larsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/433,152

(22) PCT Filed: Sep. 5, 2013

(86) PCT No.: PCT/SE2013/051036
§ 371 (c)(1),
(2) Date: Apr. 2, 2015

(87) PCT Pub. No.: WO2014/065739
PCT Pub. Date: May 1, 2014

(65) Prior Publication Data
US 2015/0264651 A1    Sep. 17, 2015

Related U.S. Application Data (60) Provisional application No. 61/718,743, filed on Oct. 26, 2012.

(51) Int. Cl.
*H04B 7/00*  (2006.01)
*H04W 52/12* (2009.01)
(Continued)

(52) U.S. Cl.
CPC ............. *H04W 52/12* (2013.01); *H04L 1/0026* (2013.01); *H04L 1/1812* (2013.01);
(Continued)

(58) Field of Classification Search
CPC ... H04L 1/0026; H04L 1/1812; H04L 1/1896; H04L 2001/0093; H04L 5/0055; H04W 52/12; H04W 52/24; H04W 52/40; H04W 52/48

USPC .......... 455/522, 69, 501, 434, 436, 442, 13.4, 455/67.11, 67.16, 115.1; 370/328, 329, 370/311, 335, 332, 216, 248; 375/141, 267, 375/232, 295, 260
See application file for complete search history.

(56) References Cited

U.S. PATENT DOCUMENTS

2008/0273454 A1* 11/2008 Malkamaki ........... H04L 1/1838
                                                                   370/216
2009/0092079 A1*  4/2009 Marinier ............... H04L 1/1835
                                                                   370/328

(Continued)

FOREIGN PATENT DOCUMENTS

EP     2451224 A1    5/2012
EP     2456115 A1    5/2012

(Continued)

OTHER PUBLICATIONS

3GPP TR 25.871 V11.0.0 "3rd Generation Partnership Project; Technical Specification Group Radio Access Network; Uplink Multiple Input Multiple Output (MIMO) for High Speed Packet Access (HSPA) (Release 11)," XP050554073, Sep. 2011, pp. 1-42.

(Continued)

*Primary Examiner* — Tan H Trinh
(74) *Attorney, Agent, or Firm* — Patent Portfolio Builders, PLLC (57) ABSTRACT

A control node is configured to control a SIR-target for use by the radio network node when operating an Inner Loop Power Control. The radio network node receives a primary stream and a secondary stream while employing HSUPA MIMO. The radio network node detects a first indication of number of HARQ re-transmissions. The first indication is related to the primary stream. The radio network node detects a second indication of number of HARQ re-transmissions. The second indication is related to the secondary stream. The radio network node configures an Iub frame based on one or more of the first and second indication. The control node is configured to perform OLPC. Subsequently, the control node receives the Iub frame from the radio network node and extracts the first and/or second indication/s from the Iub frame. Next, the control node determines the SIR-target based on the first indication.

15 Claims, 7 Drawing Sheets

(51) Int. Cl.
- *H04L 1/00* (2006.01)
- *H04L 5/00* (2006.01)
- *H04W 52/24* (2009.01)
- *H04W 52/40* (2009.01)
- *H04W 52/48* (2009.01)
- *H04L 1/18* (2006.01)

(52) U.S. Cl.
CPC ............ *H04L 5/0055* (2013.01); *H04W 52/24* (2013.01); *H04L 1/1896* (2013.01); *H04L 2001/0093* (2013.01); *H04W 52/40* (2013.01); *H04W 52/48* (2013.01)

(56) References Cited

U.S. PATENT DOCUMENTS

| | | | | |
|---|---|---|---|---|
| 2010/0041427 | A1* | 2/2010 | Hannu | H04W 52/16 455/522 |
| 2010/0197304 | A1* | 8/2010 | Sawhney | H04W 48/10 455/434 |
| 2010/0197337 | A1* | 8/2010 | Larsson | H04W 52/12 455/522 |
| 2011/0044263 | A1* | 2/2011 | El-saidny | H04W 52/12 370/329 |
| 2011/0263281 | A1* | 10/2011 | Cai | H04B 7/0404 455/501 |
| 2012/0002610 | A1* | 1/2012 | Widegren | H04W 52/12 370/328 |
| 2012/0099444 | A1* | 4/2012 | Hakola | H04W 52/242 370/248 |
| 2012/0177089 | A1* | 7/2012 | Pelletier | H04B 7/0417 375/219 |
| 2012/0287867 | A1* | 11/2012 | Sambhwani | H04W 52/325 370/329 |
| 2012/0287868 | A1* | 11/2012 | Sambhwani | H04L 1/1887 370/329 |
| 2013/0201940 | A1* | 8/2013 | Zhang | H04W 52/12 370/329 |
| 2013/0223363 | A1* | 8/2013 | Sambhwani | H04W 72/04 370/329 |
| 2013/0242827 | A1* | 9/2013 | Lampinen | H04W 76/048 370/311 |
| 2014/0037019 | A1* | 2/2014 | Akkarakaran | H04B 7/0404 375/267 |
| 2014/0226735 | A1* | 8/2014 | Zhang | H04B 7/0452 375/260 |
| 2015/0131621 | A1* | 5/2015 | Maiya | H04W 52/12 370/336 |
| 2015/0229370 | A1* | 8/2015 | Lidian | H04L 1/1861 370/335 |

FOREIGN PATENT DOCUMENTS

| | | |
|---|---|---|
| WO | 2004091114 A1 | 10/2004 |
| WO | 2006059172 A1 | 6/2006 |
| WO | 2010107377 A1 | 9/2010 |
| WO | 2012064781 A1 | 5/2012 |
| WO | 2012087222 A2 | 6/2012 |

OTHER PUBLICATIONS

Author Unknown, "LS on RAN1 agreements on MIMO with 64 QAM for HSUPA," R1-124014, 3GPP TSG RAN WG1 Meeting #70, Release 11, Aug. 13-17, 2012, Qingdao, P.R. of China, 3 pages.

Author Unknown, "Technical Specification Group Radio Access Network; UTRAN Iub/Iur interface user plane protocol for DCH data streams (Release 10)," Technical Specification 25.427, Version 10.1.0, 3GPP Organizational Partners, Jun. 2011, 48 pages.

Author Unknown, "Technical Specification Group Radio Access Network; Medium Access Control (MAC) protocol specification (Release 10)," Technical Specification 25.321, Version 10.2.0, Mar. 2011, 198 pages.

Huawei, "Considerations on DC-HSUPA Operation," R1-090886: 3GPP TSG RAN WG1 Meeting #56, Agenda Item: 9, Feb. 9-13, 2009, Athens, Greece, 3 pages.

Nokia Siemens Networks, "MIMO with 64QAM for HSUPA (Release 11)," RP-111642, 3GPP TSG-RAN Meeting #54, Agenda Item: 13.1, Dec. 6-9, 2011, 6 pages.

International Search Report and Written Opinion for PCT/SE2013/051036, mailed Mar. 13, 2014, 14 pages.

Office Action in EP application No. 13848533.9 mailed Oct. 22, 2015.

* cited by examiner

METHODS AND NETWORK NODES FOR IMPROVING OLPC FUNCTIONALITY FOR HSUPA MIMO

This application is a 35 U.S.C. §371 national phase filing of International Application No. PCT/SE2013/051036, filed Sep. 5, 2013, the disclosure of which is incorporated herein by reference in its entirety.

TECHNICAL FIELD

Embodiments herein relate to wireless communication systems, such as telecommunication systems. In particular, methods and network nodes for enabling Outer-Loop Power Control performed by a control node are disclosed.

BACKGROUND

Currently the Release-11 (Rel-11) work item 'MIMO with 64QAM for HSUPA', RP-111642, by Nokia Siemens Networks, is standardized in Third Generation Partnership Project (3GPP). The objective of this work item is to specify the support of uplink 2×2 Multiple-Input-Multiple-Output (MIMO) with 64-Quadrature Amplitude Modulation (64QAM) as an additional feature for High Speed Uplink Packet Access (HSUPA) in Frequency Division Duplex (FDD). Uplink (UL) MIMO allows the user equipment (UE) to simultaneously transmit up to two Media Access (MAC)-i Packet Data Units (PDUs), or transports blocks (TBs), in the same Transmission Time Interval (TTI) on orthogonal beams, (virtual antennas). Thus, there may be two streams in each TTI.

Power control is fundamental in an HSUPA system in order to combat a so called near-far problem, and to hamper the effect of channel fading. In general, the near-far problem relates to a condition in which a receiver captures a strong signal and thereby makes it impossible for the receiver to detect a weaker signal. Provided that the dynamic range of the transmit power of the user equipment is large enough, and that the power update is faster than the fading, it follows that the channel becomes an essentially non-fading channel. The basic operation of fast power control, also referred to as inner-loop power control (ILPC), is as follows. The estimated received Signal-to-Interference Ratio (SIR) is compared to the target SIR value. If the measured SIR is higher than the target SIR, the base station will command the user equipment to lower its power, and vice versa. The SIR target is controlled by the outer-loop power control (OLPC) mechanism in order to achieve a certain quality target for the data (E-DCH Dedicated Physical Data Channel, where E-DCH stands for Enhanced Dedicated Channel, or abbreviated as E-DPDCH). In one example, the certain quality target is Block-Error-Rate (BLER) or Number of Hybrid Automatic Repeat request (HARQ) Retransmissions (NHR). Hence, if the quality is lower than the target quality, the SIR target is increased and vice versa. Consequently, the OLPC is one means to control the quality of data (E-DPDCH). The OLPC is located in the Radio Network Controller (RNC), and the exact algorithm is implementation specific and hence not standardized. For Dedicated Channel (DCH) traffic, the OLPC typically sets the SIR target to fulfil a certain BLER target. For Enhanced-Uplink (EUL) traffic, on the other hand, the BLER is a poor measure to base the SIR target on. One reason is that the HARQ functionality is located in the NodeB and another reason is that the BLER that is visible to the RNC will in most cases be close to zero. That is to say, a BLER that is close to zero provides no or little information about data quality. A better measure of data quality for EUL traffic is therefore the number of transmissions required for successful decoding, i.e. a specific number of transmission attempts for successful decoding is targeted.

In soft/softer-handover, the UE will get ILPC commands from several nodes. In this case the UE will follow a "DOWN-before-UP" principle, i.e. it is enough that one node indicate a DOWN command for the UE to lower its power. Also, due to soft handover (SHO), the data quality from several nodes may influence the SIR target, and therefore the OLPC mechanism is located in the RNC. Several nodes may forward information about the data quality to the RNC, which uses this information to set the appropriate SIR target. Typically, the nodes report the number of transmission attempts required to successfully decode the data packet (or if data failed to be decode after the maximum number of transmission attempts). Since the OLPC resides in the RNC, it is rather slow and may be subject to delayed information.

HARQ is used to overcome transmission errors that can not be corrected using forward error correcting codes (channel codes). At the transmitter side a Cyclic Redundancy Check (CRC) code is appended to each transport block. The decoder at the receiver side can then use this CRC code to validate the received and decoded transport block. If the CRC checks (true), the transport block is considered to be successfully received, otherwise the transport block is considered to be subject to errors and needs to be retransmitted. If the CRC checks, i.e. is correct, a positive acknowledgment (ACK) is sent by the receiver to the transmitter, whereas if the CRC fails, i.e. is wrong, a Negative Acknowledgment (NACK) is conveyed to the transmitter. In soft/softer handover, the UE will get acknowledgment messages from several nodes, and in this case it is enough that one node sends an ACK, to consider the packet successfully received. Once a node has successfully decoded a packet, that node will forward the packet to the RNC. In addition to the decoded packet, the node will forward information about the number of transmission attempts needed to decode the packet. This information is then used by the RNC to set the appropriate SIR target.

In the current frame protocol, as specified in "UTRAN Iub/Iur interface user plane protocol for DCH data streams", 3GPP TS (Technical Specification) 25.427 (v11.4.0), for each subframe of the Enhanced Dedicated Channel (E-DCH) Type 1 and Type 2 frame, there exist an Iub information field for signalling the number of HARQ retransmissions from NodeB to a RNC, such as a serving RNC (SRNC) (See 25.427; Section 6.2.4.11). When the TTI length is 2 ms, one Iub Frame can contain up to 5 subframes; when the TTI length is 10 ms, one Iub Frame can contain 1 subframe.

Number of HARQ Retransmissions (NHR) as Currently Defined in 25.427:

Description: Indicates the number of HARQ retransmissions used for successful decoding of the payload, or in case of HARQ decoding failure the number of HARQ retransmissions that were used at the time when the HARQ decoding failure was detected. The value 13 indicates that the actual number of retransmissions is inappropriate as input to the outer loop power control. The value 15 indicates that the Node B could not calculate the number of HARQ retransmissions.

Value Range: {0-15}

Value {12}: Used for indicating that the number of HARQ retransmissions was 12 or higher.

Value {13}: Used for indicating that the number of HARQ retransmissions shall not be used by the outer loop power control.

Values {14}: Reserved in this user plane revision. Shall be ignored by the receiver.

Value {15}: Used for indicating that the number of HARQ retransmissions is unknown.

Field length: 4 bits.

With the definition directly above, there is a risk that the OLPC, as described somewhat further above, may fail when user equipments operate in UL MIMO.

SUMMARY

An object is to enable UL MIMO, such as HSUPA MIMO, in a wireless communication system, such as a Universal Terrestrial Radio Access Network (UTRAN) system.

According to an aspect, the object is achieved by a method, performed by a radio network node, for enabling OLPC performed by a control node. The control node is configured to control a SIR-target for use by the radio network node when operating an ILPC. The radio network node receives a primary stream and a secondary stream while employing HSUPA MIMO. The radio network node detects a first indication of number of HARQ re-transmissions. The first indication is related to the primary stream. Moreover, the radio network node detects a second indication of number of HARQ re-transmissions. The second indication is related to the secondary stream. Then, the radio network node configures an Iub frame based on one or more of the first and second indication.

According to another aspect, the object is achieved by a radio network node configured to enable OLPC performed by a control node. The control node is configured to control a SIR-target for use by the radio network node when operating an ILPC. The radio network node is configurable to receive a primary stream and a secondary stream while employing HSUPA MIMO. The radio network node comprises a processing circuit configured to detect a first indication of number of HARQ re-transmissions. The first indication is related to the primary stream. Moreover, the processing circuit is configured to detect a second indication of number of HARQ re-transmissions. The second indication is related to the secondary stream. Furthermore, the processing circuit is configured to configure an Iub frame based on one or more of the first and second indication.

According to a further aspect, the object is achieved by a method, performed by a control node, for performing OLPC. The control node is configured to control a SIR-target for use by a radio network node when operating an ILPC. The radio network node handles a primary stream and a secondary stream while employing HSUPA MIMO. The control node receives the Iub frame from the radio network node. Next, at least one of the following two actions is performed. The control node extracts, from the Iub frame, a first indication of number of HARQ re-transmissions. The first indication is related to the primary stream. The control node extracts, from the Iub frame, a second indication of number of HARQ re-transmissions. The second indication is related to the secondary stream. Then, the control node determines the SIR-target based on the first indication.

According to an aspect, the object is achieved by a control node configured to perform OLPC. The control node is configured to control an SIR-target for use by the radio network node 110 when operating an ILPC. The radio network node is configurable to handle a primary stream and a secondary stream while employing HSUPA MIMO. The control node comprises a processing circuit configured to receive a Iub frame from the radio network node. Furthermore, the processing circuit is configured to at least one of: to extract, from the Iub frame, a first indication of number of HARQ re-transmissions, and to extract, from the Iub frame, a second indication of number of HARQ re-transmissions. The first indication is related to the primary stream. The second indication is related to the secondary stream. Moreover, the processing circuit further is configured to determine the SIR-target based on the first indication.

Thanks to that the radio network node detects the first indication and the second indication, the radio network node is able to distinguish number of HARQ re-transmissions for the primary stream from number of HARQ re-transmissions for the secondary stream. Then, the radio network node configures the Iub frame based on one or more of the first and second indication. That is to say, the radio network node may choose how to configure the Iub frame depending on, for example, capabilities of the control node. As an example, the control node may expect, due to its capabilities, the Iub frame to only indicate number of HARQ re-transmissions for the primary stream, i.e. the first indication. In such example, the radio network node, consequently, configures the Iub frame based on only the first indication, since the radio network node knows that the first indication is related to the primary stream.

Embodiments herein disclose how to make sure that the correct information is available to the control node, such as an RNC, for operating the OLPC when MIMO is configured. In particular, one solution that requires no standard changes is described. Additionally, another method, more general and possibly future proof, i.e. forward compatible, is described herein.

Some embodiments herein are backward compatible, i.e. a control node, such as an RNC, according to prior art may be operated together with a radio network node, such as a Node B, according to some embodiments herein.

Furthermore, solutions for how the radio node may associate data packets with the primary and/or secondary stream are disclosed.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

In order to better appreciate the benefits and advantages of the present invention, problems with existing solutions, as realized by the present inventors, will be described here.

Figure 1:
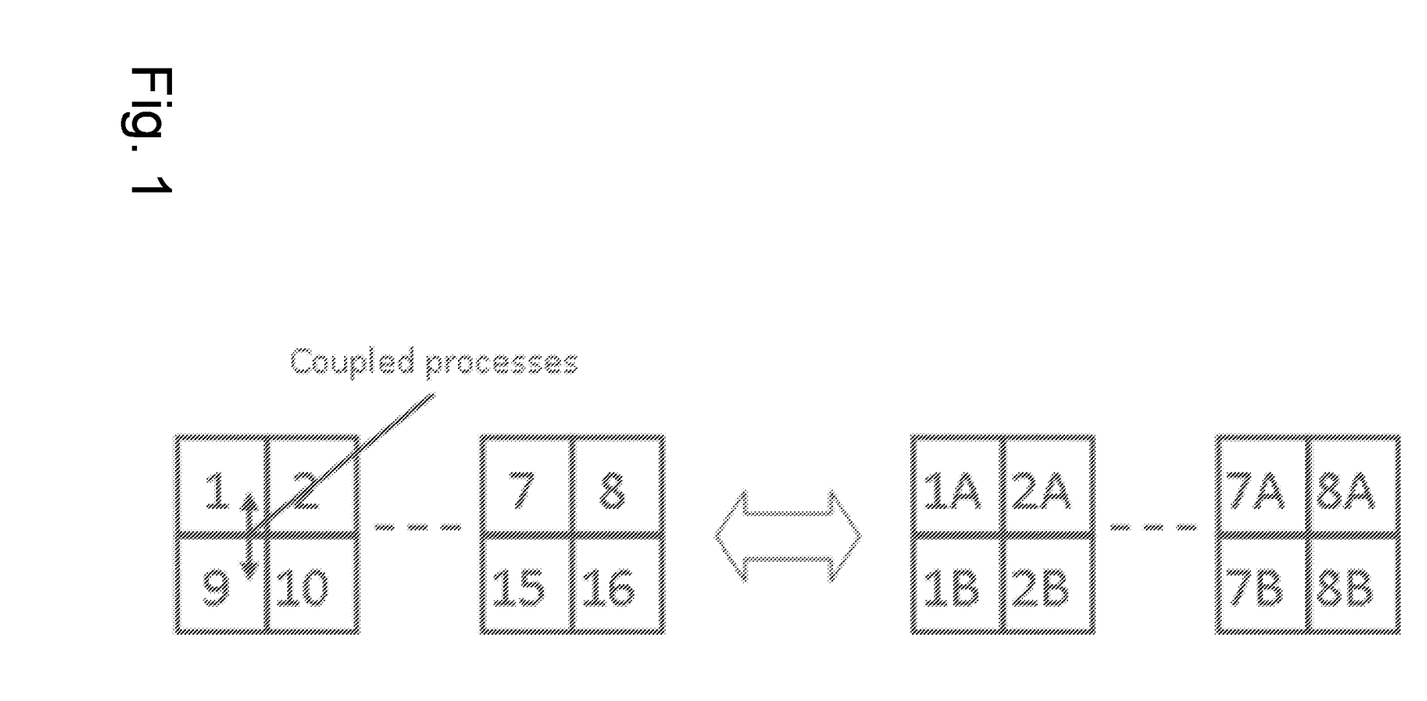
FIG. 1 is a block diagram illustrating an exemplifying manner of how to couple HARQ processes.

In UL MIMO, e.g. HSUPA MIMO or EUL MIMO, one or two independently encoded transport blocks (TBs) will be transmitted from a UE to a Node B, depending on a preferred rank. A primary TB, e.g. on E-DPDCH, is transmitted in the primary stream and a secondary TB, e.g. on Secondary E-DCH Dedicated Physical Data Channel (S-E-DPDCH), is transmitted in the secondary stream. The rank relates to a number of streams used for transmissions between the Node B and the UE. Since there can be up to two transport blocks transmitted in each TTI, the effective number of HARQ processes needs to be doubled as compared to solutions adapted to handle only one stream, and the HARQ processes are coupled in pairs, i.e. one for each stream.

An example of how to couple HARQ processes is shown in FIG. 1 Error! Reference source not found. The notion of process A & B is used herein to distinguish between the two coupled processes. However, other means to target/distinguish HARQ processes can be envisioned, and the embodiments herein are by no means limited to the chosen alternative, which is chosen to simplify the presentation. In FIG. 1, two HARQ processes will be associated, or coupled, to each other, but the exact procedure of how to associate HARQ processes may be different from what is described here. Two examples are, however, given in FIG. 1, i.e. notation A and B or process k and process (k+#processes). In this example, the number of HARQ processes is 8, i.e. a so called HARQ_RTT (Round Trip Time, RTT)=8. Explicitly, HARQ_RTT means the number of HARQ processes per HARQ entity is equal to the HARQ round-trip-time.

Furthermore, for HSUPA MIMO a single ILPC loop, operating on DPCCH, is used and a single OLPC loop targeting the quality of the primary stream (E-DPDCH) is used. That is to say, there will not be multiple ILPC and/or OLPC loops, such as having one ILPC and/or OLPC for each stream. Instead, the quality of the secondary stream (S-E-DPDCH) is "best effort" and the rate is controlled via a rate-control mechanism. Therefore, the secondary stream should not affect the SIR target set by the one and only OLPC loop.

Consequently, a mechanism that makes sure that the OLPC works as intended for EUL MIMO is needed. In particular, it is only the quality of the primary stream that should affect the SIR target. Without modification the RNC, as an example of a control node, is not able to distinguish between a primary stream packet and a secondary stream packet (or associated information regarding the number of transmission attempts).

Another related problem is what is exactly meant by 'primary stream'. For example, a data packet that originally was transmitted on the secondary stream may be retransmitted on the primary stream. Such a packet may be a primary or secondary stream packet depending on chosen definition.

In order to support HSUPA MIMO with 64QAM, solutions for ensuring that the outer-loop power control (OLPC) operates as intended is required. In particular, it needs to be ensured that the correct information is conveyed from NodeB to RNC in order to set the SIR target.

Embodiments herein disclose alternatives for how to make sure that the OLPC functionality can satisfy the agreement that only the quality of the primary stream should be considered when determining the SIR target. In other words, since the OLPC resides in the RNC, and the exact implementation is proprietary, we need to make sure that the required/correct information is available to the RNC. In particular, one alternative proposes that the quality of both streams should be reported to the RNC, as we believe that in the future this information can be used for more elaborated power control, and other purposes.

Furthermore, the problem of defining 'primary stream' is addressed by the embodiments described herein.

Throughout the following description similar reference numerals have been used to denote similar elements, network nodes, parts, items or features, when applicable. In the Figures, features that appear in some embodiments are indicated by dashed lines.

Figure 2:
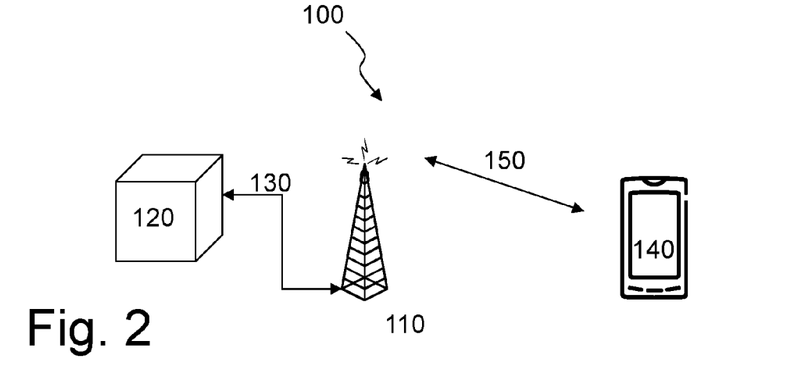
FIG. 2 is a schematic overview of an exemplifying radio communication system in which embodiments herein may be implemented.

FIG. 2 depicts an exemplifying wireless communications system 100 in which embodiments herein may be implemented. In this example, the wireless communications system 100 is a UTRAN system. In other examples, the wireless communication system may be any 3GPP cellular communication system, such as a Wideband Code Division Multiple Access (WCDMA) network, a Global System for Mobile communication (GSM system) or the like.

The radio communication system 100 comprises a radio network node 110 and a control node 120. As used herein, the term "radio network node" may refer to a Node B (NB), a radio base station, an access point or the like. The control node 120 may be a Radio Network Controller (RNC).

The radio network node 110 and the control node 120 may communicate 130 with each other over an interface, such as Iub of UTRAN. The Iub interface carries user traffic (such as voice or data) as well as control information.

Furthermore, a user equipment 140 is located in the vicinity of the radio network node 110. The user equipment 140 may be operated in UL MIMO. As used herein, the term "user equipment" may refer to a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc.

The user equipment 140 and the radio network node 110 may communicate 150 with each other over a radio interface, such as a Uu interface using Wideband Code Division Multiple Access (WCDMA) as part of the UTRAN system.

Figure 3:
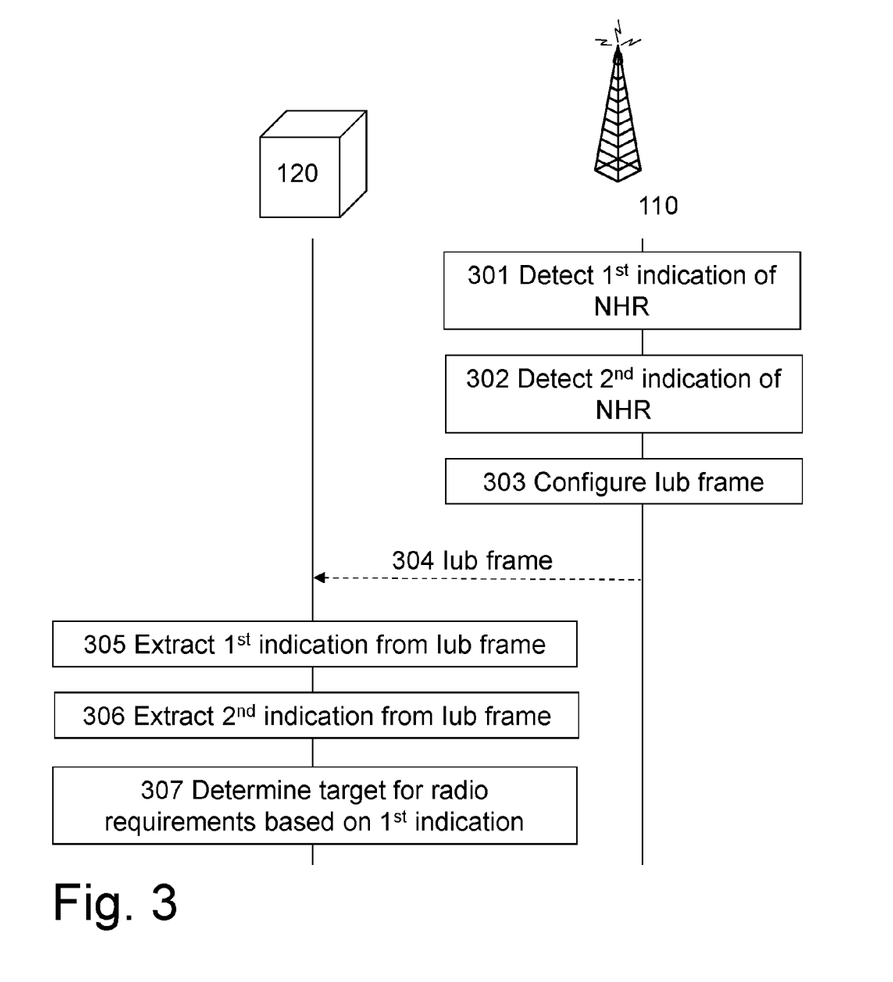
FIG. 3 is a schematic, combined signalling scheme and flowchart illustrating embodiments of the methods herein when performed in the radio communication system according to FIG. 2.

FIG. 3 illustrates an exemplifying method according to embodiments herein when implemented in the radio communication system 100 of FIG. 2. The radio network node 110 performs a method for enabling Outer-Loop Power Control "OLPC" performed by the control node 120. Furthermore, the control node 120 performs a method for performing OLPC.

The control node 120 is configured to control a Signal-to-Interference Ratio-target, "SIR-target", for use by the radio network node 110 when operating an Inner Loop Power Control "ILPC". The radio network node 110 receives a primary stream and a secondary stream while employing High-Speed Uplink Packet Access Multiple-Input-Multiple-Output "HSUPA MIMO". Expressed differently, the radio network node 110 handles a primary stream and a secondary stream while employing HSUPA MIMO.

The following actions may be performed in any suitable order.

Action 301

The radio network node 110 detects, or determines, a first indication of number of Hybrid Automatic Repeat reQuest "HARQ" re-transmissions, wherein the first indication is related to, or associated with, the primary stream. The first indication may be a first value indicating a first number of HARQ retransmissions for the primary stream.

The number of HARQ retransmission may be detected by counting the number of NACKs sent to the user equipment in response to failed CRCs of received transmissions in the primary stream.

Action 302

The radio network node 110 detects, or determines, a second indication of number of HARQ re-transmissions. The second indication is related to, or associated with, the secondary stream. The second indication may be a second value indicating a second number of HARQ retransmissions for the secondary stream.

The number of HARQ retransmission may be detected by counting the number of NACKs sent to the user equipment in response to failed CRCs of received transmissions in the secondary stream.

Action 302 may be performed before action 301.

Action 303

The radio network node 110 configures an Iub frame based on one or more of the first and second indication. That is to say, the radio network node may choose how to configure the Iub frame depending on, for example, capabilities of the control node. As an example, the control node may expect, due to its capabilities, the Iub frame to only indicate number of HARQ re-transmissions for the primary stream, i.e. the first indication. The capabilities of the control node, i.e. functionality thereof, may be indicated by a release number of the control node. The release number may be sent to the radio network node, possibly on request from the radio network node.

As an example, the radio network node 110 configures a message, such the Iub frame. The message may carry information relating to NHR and payload data. The message may be configured based on one or more of the first indication, the second indication and whether UL MIMO (EUL MIMO, HSUPA MIMO) is employed or not. Therefore, as an example, the message may comprise the information relating to NHR, which may relate to only one stream, such as the primary or secondary stream, or to both streams, such as the primary and secondary stream. Furthermore, sometimes the message may not comprise any information relating to NHR, i.e. NHR for none of the streams is transmitted. The manner in which the message is configured is elaborated in solutions A-D below.

In some examples, the information relating to NHR may be the first indication of NHR and/or the second indication of NHR.

Action 303 is performed after at least one of actions 301 and 302.

Solution A

According to some first embodiments, referred to as "solution A", the Iub frame may be configured based on only the first indication as briefly mentioned already.

In order to make sure that the correct information is used to set the SIR target, one alternative is to make sure that the radio network node 110 only forwards the number of transmission attempts associated with a primary stream packet. This can be achieved within the current standard by allowing the radio network node 110 to only include the NHR for the primary stream packets in each subframe. Thus, no information about number of HARQ re-transmissions for the secondary stream will be provided to the control node 120.

Another alternative is to using Value {13} in the NHR field for secondary stream packets, i.e. for all packets associated with the secondary stream, then NHR value {13} is used to inform the control node 120 that this information should not be used by the outer loop power control. This approach requires no new Iub signalling, but there is a need to specify in the text in the specification the above purpose.

For example, a note stating that "When UL MIMO is in use, a Node B should only send the NHR for primary stream packets in the subframe" would be required.

Alternatively, it could be stated that "When UL MIMO is in use, a Node B should use value 13 (or value 14, or value 15) when transmitting secondary stream packets in the subframe".

Alternatively, the NHR may be extended to 5 bits by using the spare bit "Bit 7" in the same octet.

New values to specify the secondary stream, in case of UL MIMO operation, may be defined by these bits.

Solution B

According to some second embodiments, referred to as "solution B", the Iub frame may comprise a first field for indicating HSUPA MIMO in use and a second field for carrying the second indication. In some examples, the first field is a flag for indicating when UL MIMO is used. See UL MIMO in for example FIGS. 4 and 5 below.

As mentioned, the Iub frame may comprise the second indication, such as NHR S, as carried by the second field. See for example FIGS. 4 and 5 below.

In solution B, NHR for the secondary stream is signalled from the radio network node 110 to the control node 120.

In one alternative, a new NHR IE is introduced for each subframe in the frame protocol 25.427. We could use the existing NHR for primary stream packets, which would be the same as in legacy where there is only one (primary) stream. The new introduced NHR will be used when secondary stream packets are transmitted The new IE can be introduced by using the spare bits in the Header, or in the spare extension.

Figure 4:
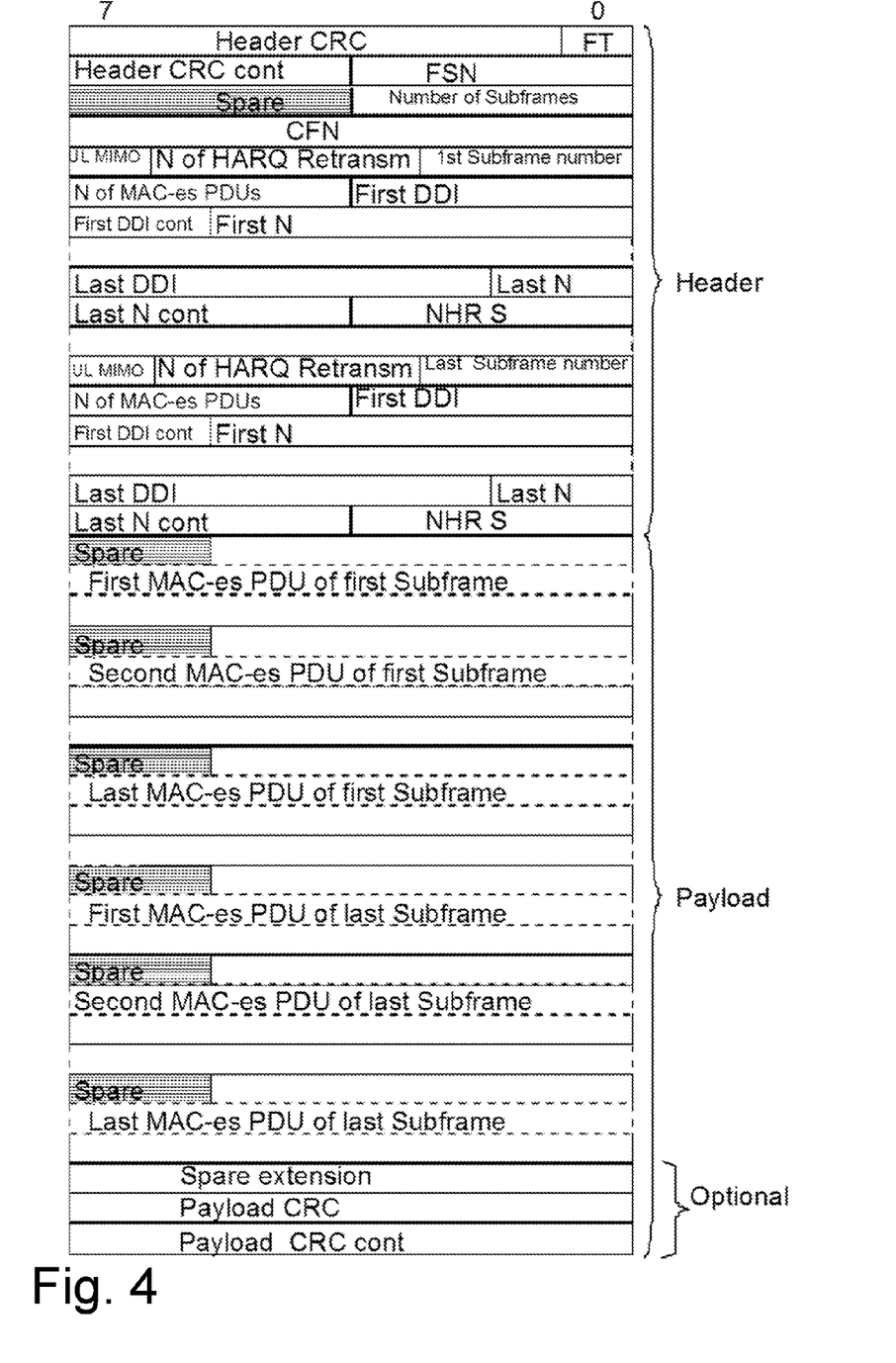
FIG. 4 is a block diagram illustrating an Iub frame according to embodiments herein.
Figure 5:
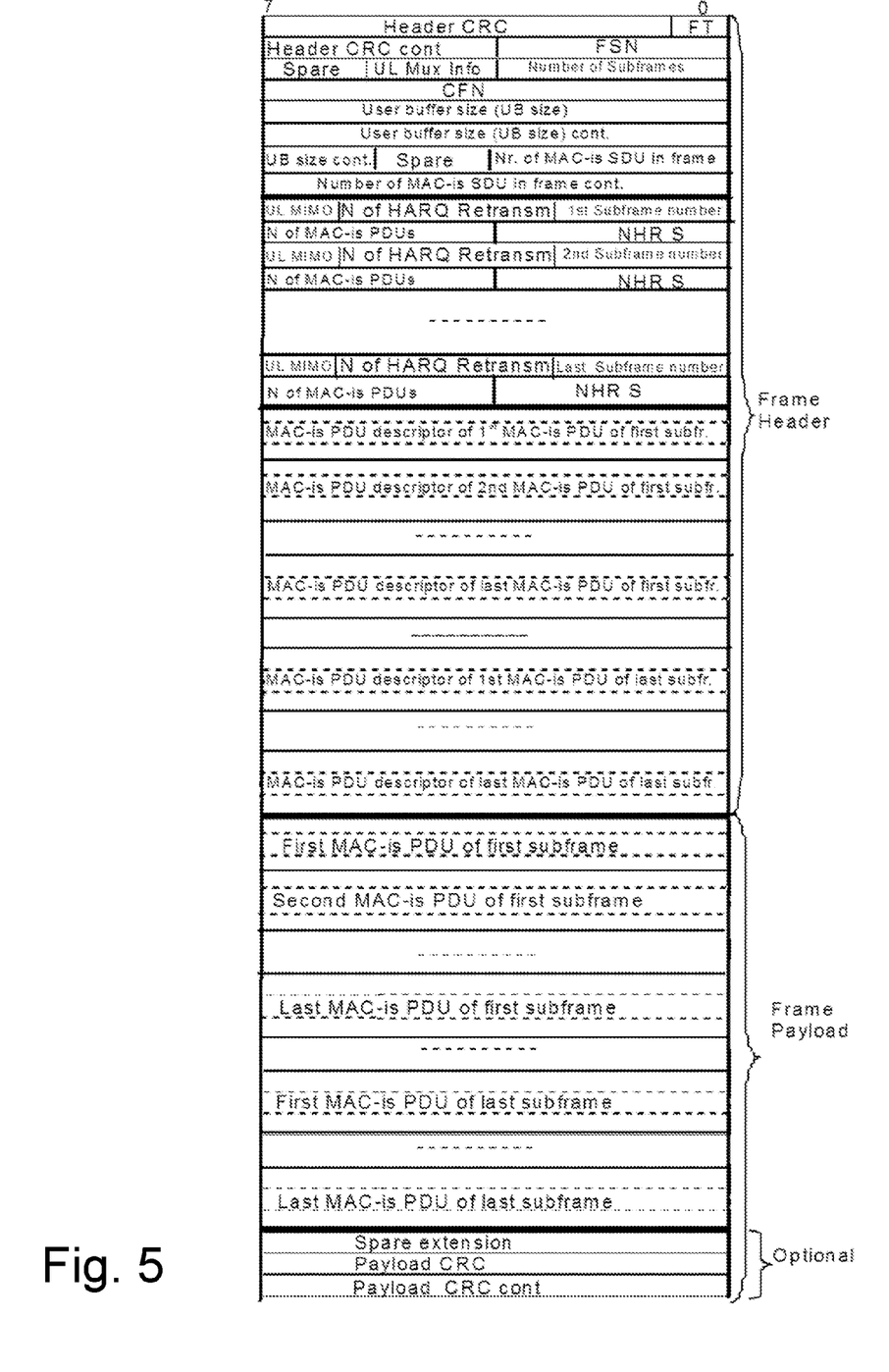
FIG. 5 is a block diagram illustrating an Iub frame according to further embodiments herein.

An example to achieve this is to use the spare bits in the subframe in the Header. Refer to FIG. 4 and FIG. 5. The 4 bits Pad in Type 1 and Spare in Type 2 are defined as NHR for the secondary stream when UL MIMO is in use (NHR S).

New IE:

Number of HARQ Retransmissions for the secondary stream, NHR S

Description: Indicates the number of HARQ retransmissions used for successful decoding of the payload, or in case of HARQ decoding failure the number of HARQ retransmissions that were used at the time when the HARQ decoding failure was detected for the secondary stream during UL MIMO. Thanks to the UL MIMO, it is possible to transmit NHR S=0 for the secondary stream. Only when UL MIMO is set to 1, the NHR S bits are to be interpreted as indicating the number of HARQ retransmissions. In prior art, the spare bits used for UL MIMO and NHR S are zero padded. Thus, without the UL MIMO, NHR S=0 would not be possible to distinguish from zero padded spare bits.

Value range: {0-15}

The advantage of this solution is that NHR for both primary stream and secondary stream are provided, when both streams are transmitted in the same TTI. RNC can use the information for future purpose. For example, envision that the OLPC should be based on the quality of both streams in some scenarios.

New IE:

UL MIMO (Bit 7) Description: Indicates when UL MIMO is used and NHR S for the secondary stream is presented.

Value:
0: Not Relevant
1: UL MIMO and NHR S are presented.

If the Spare extension is used, the "New IE Flags" should be allocated and the IE Flag for the presence of NHR S should be defined.

Another alternative is to use the new NHR S IE only when rank 2 transmission, i.e. the primary and the secondary streams are present, is used.

Another alternative is to introduce a new data frame for UL MIMO operation, which include NHR information for both streams.

Solution C

According to some third embodiments, referred to as "solution C", the Iub frame may comprise a fourth field, indicating number of HARQ re-transmissions, and a third field, indicating whether the fourth field relates to the primary stream or the secondary stream.

In this solution, the correct information for setting the SIR target is made available to the control node 120 thanks to that the radio network node 110 signals information to the control node 120 about which stream the NHR is associated with. For example, one or several additional information bit(s) containing information about which stream the information is associated with is(are) included in the NHR information field in frame protocol 25.427. Hence, the Iub frame may comprise a third indication, such as NHR I. See for example FIG. 6 below.

The new indication IE can be introduced in the spare bits in the Header, or in the spare extension.

Figure 6:
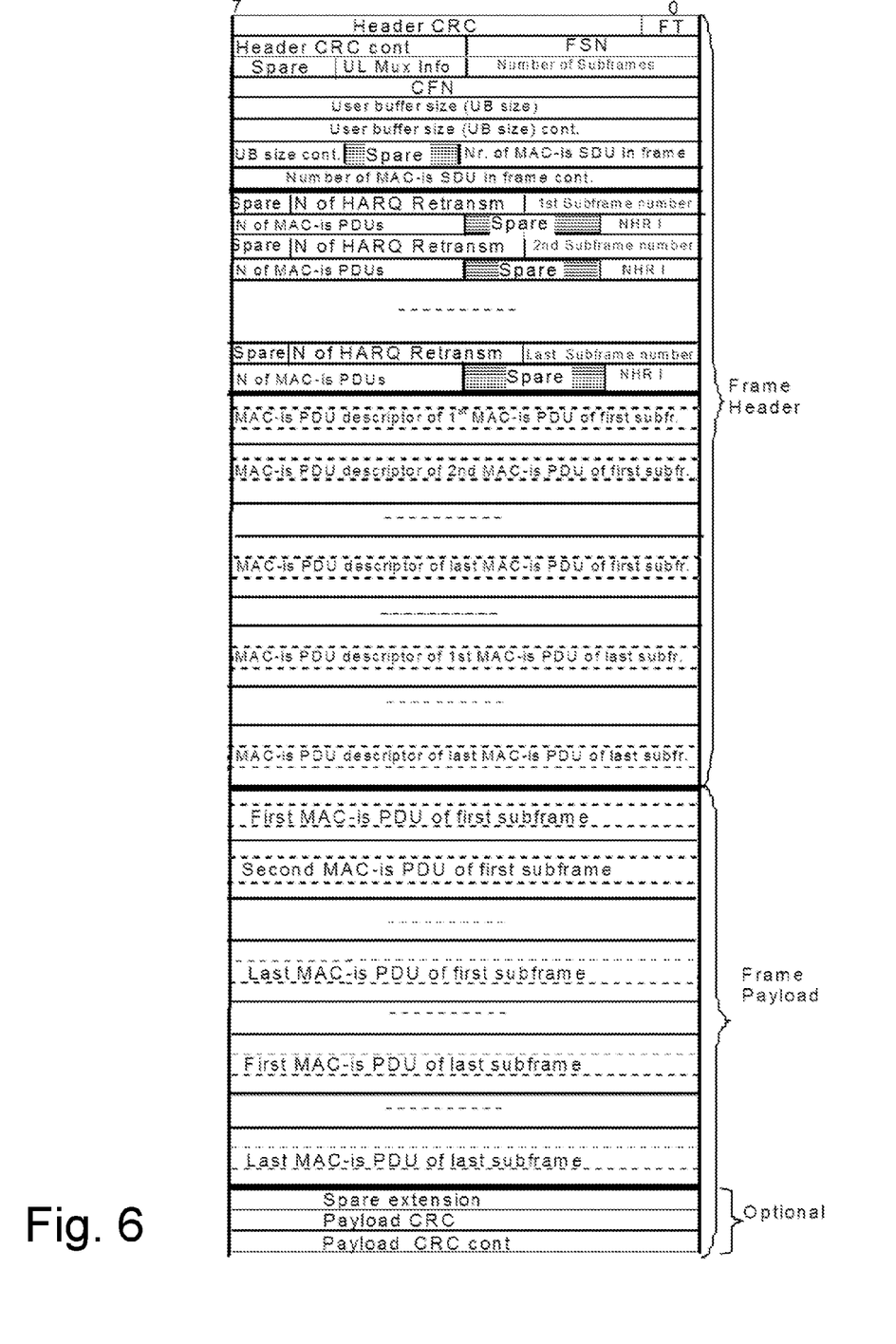
FIG. 6 is a block diagram illustrating an Iub frame according to yet other embodiments herein.

An example to achieve this is to use the spare bits in the subframe in the Header. Refer to FIG. 6. The two spare bits in the subframe in the Header is defined as indication of NHR (NHR I in FIG. 6).

New IE

Indication of association of Number of HARQ Retransmissions and stream, NHR I

Description: Indicates the stream that the NHR is associated with when UL MIMO is in use.

Value range: {0,3}.
0: Not relevant
1: Primary Stream
2: Secondary Stream
3: reserved
Field length: 2 bit.

The example is only give on E-DCH UL DATA FRAME TYPE 2. Similar change can apply to E-DCH UL DATA FRAME TYPE 1.

Alternatively, we could also define the bit 3 as "both streams", then Node B will send the NHR for both streams in one field to RNC.

Solution D

According to some fourth embodiments, referred to as "solution D", the Iub frame may comprise a fifth field indicating whether a data packet included in the Iub frame is associated with the primary stream or the secondary stream.

In this solution, a new information field, i.e. the fifth field, containing information about which stream the data packet is associated with is introduced in the frame protocol 25.427. It is then up to the OLPC to take the correct information into account when setting the SIR target. This approach requires new signalling, but the benefit is that extra information becomes available in the control node 120 that can be used for other purposes, now or in the future. One could, e.g. envision that the OLPC should be based on the quality of both streams in some scenarios.

The new indication IE can be introduced in the spare bits in the Header, or in the spare extension.

An example to achieve this is to use the spare bits in the subframe in the Header. Similar to Solution C, instead of NHR I, we can define a new IE to indicate which stream the data packet is associated (Data I)

New IE

Indication of association of data packet and stream in UL MIMO, Data I

Description: Indicates the stream that the data packet in the subframe is associated with when UL MIMO is in use.

Value range: {0,3}.
0: Not relevant
1: Primary Stream
2: Secondary Stream
3: both streams
Field length: 2 bit.

When the subframe is associated to both streams in UL MIMO, we can define that the NHR is associated to only Primary Stream, or to both Streams.

The description of the actions illustrated in FIG. 3 is now resumed.

Action 304

The radio network node 110 may send, or sends in embodiments co-operating with the control node 120, the Iub frame to the control node 120. Therefore, when applicable, the control node 120 receives the Iub frame from the radio network node 110. As will be described below, the control node 120 may use information from the Iub frame when operating the OLPC.

Next, at least one of the following two actions is performed.

Action 305

The control node 120 extracts, from the Iub frame, a first indication of number of HARQ re-transmissions. As mentioned, the first indication is related to the primary stream.

Action 306

The control node 120 extracts, from the Iub frame, a second indication of number of Hybrid Automatic Repeat reQuest "HARQ" re-transmissions. As mentioned, the second indication is related to the secondary stream.

Action 307

The control node 120 determines the SIR-target based on the first indication.

The SIR-target value, relating to radio requirements, may be based on the information relating to NHR. This means that the Iub frame comprises the information relating to NHR. In other examples, the SIR-target may be a Signal-to-Interference-and-Noise-Ratio (SINR) target, a Signal-to-Noise-Ratio (SNR) target or the like.

In some examples, the control node determines the target value relating to radio requirements based on only the first indication. Thus, only the primary stream affects the target value. The target value may relate to radio requirements for the primary stream, possibly only for the primary stream. Here, the control node takes the primary stream into consideration when determining the target value.

In some examples, the control node 120 may further determine the SIR-target based on the second indication. In this manner, the control node may also take into consideration of the secondary stream. Hence, the target value, such as the SIR-target, may be impacted by the secondary stream quality, for example in terms of the second indication. Here, the control node takes the primary stream and the secondary stream, i.e. quality thereof in terms of the first and second indications, into consideration when determining the target value.

In some further examples, the control node determines the target value relating to radio requirements based on only the second indication. Thus, only the secondary stream affects the target value. The target value may relate to radio requirements for the secondary stream, possibly only for the secondary stream.

As mentioned, embodiments herein disclose alternatives for how to make sure that the OLPC functionality can satisfy the agreement that only the quality of the primary stream should be considered when determining the SIR target. In other words, since the OLPC resides in the RNC, and the exact implementation is proprietary, we need to make sure that Node B can indicate the required/correct information for SIR target settings to the RNC.

Solution for how to Determine "Primary Stream" Information

A related problem concerns the definition of a 'primary stream' packet in the context of updating the OLPC, i.e. how does the NodeB know whether a data packet and the number of transmission attempts are associated with the primary or secondary stream. For example, a data packet that originally was transmitted on the secondary stream may be retransmitted on the primary stream; should such a packet be associated with the primary or secondary stream? To make the example a bit more concrete. Let us assume that two packets, A & B, are originally transmitted; packet A on the primary stream and packet B on the secondary stream. Both packets are unsuccessfully received (Node B sends NACK/NACK to UE) and both packets are then being retransmitted. Once again, packet A is transmitted on the primary stream and packet B on the secondary stream. This time packet A is successfully decoded, whereas packet B fails to decode (Node B sends ACK/NACK to UE). Furthermore, the preferred transmission rank changes to one. Hence, next time that packet B is scheduled, it will be the only packet transmitted and hence transmitted on the primary stream. This time packet B was successfully decoded. Consequently, packet B was successfully decoded when transmitted on the primary stream and could therefore be considered as a primary stream packet and number of transmission attempts equal to 3 would then be forwarded to the RNC and used as input to the OLPC. On the other hand, packet B was transmitted two times on the secondary stream and only once at the primary stream. Hence, it could be considered as a secondary stream packet and its information should not affect the OLPC.

One alternative to 'define' a primary stream packet would be to say that a packet is always associated with the stream where to original transmission took place. This is the same as saying that the primary stream is always associated with HARQ processes/buffers A of the two coupled HARQ processes A & B. Another alternative would be to say that a packet is always associated with the stream where the last transmission took place. Yet another alternative would be to say that a packet is always associated with the stream where the most number of transmissions took place.

How to define whether data is associated with the primary or secondary stream can be transparent to the standard, i.e. a proprietary solution may be applied. Alternatively, the 3GPP specification shall include a clarifying text, either in 25.427, or other related specification, for how a Node B should determine which stream a data packet is associated with.

FIG. 4 illustrates an exemplifying Iub frame, such as an E-DCH UL DATA FRAME TYPE 1 structure. The 4 bits Pad in the subframe in Header is defined as the new NHR for the secondary streams (NHR S). One spare bit in the subframe in Header is defined to indicate as UL MIMO. When it is set to 1, NHR S is present.

FIG. 5 illustrates an exemplifying Iub frame, such as an E-DCH UL DATA FRAME TYPE 2 structure. The 4 bits Spare in the subframe in Header is defined as the new NHR for the secondary streams (NHR S). One spare bit in the subframe in Header is defined to indicate as UL MIMO. When it is set to 1, NHR S is present.

FIG. 6 illustrates an exemplifying Iub frame, such as an E-DCH UL DATA FRAME TYPE 2 structure. The 2 bits in the Spare in the subframe in Header is defined as the NHR Indicator (NHR I)

Figure 7:
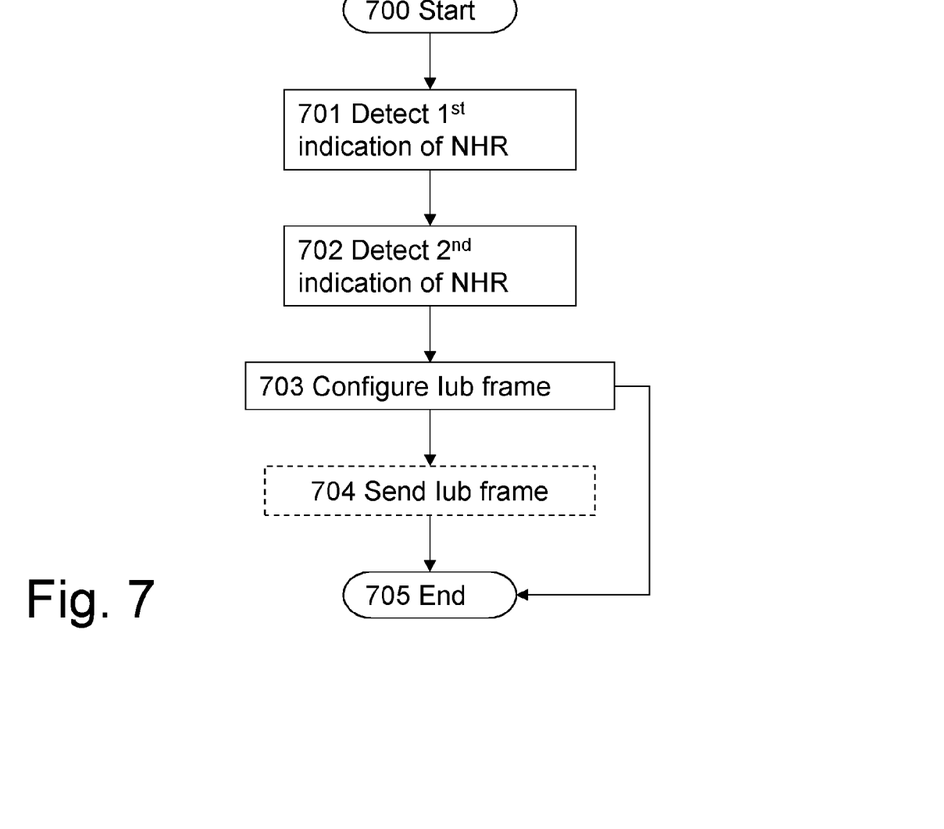
FIG. 7 is a flowchart illustrating embodiments of the method in the radio network node.

With reference to FIG. 7, embodiments of the method in the radio network node 110 are described. Actions described here are similar to the actions described in FIG. 3 as seen from the radio network node 110. Thus, as mentioned the radio network node 110 performs a method for enabling OLPC performed by the control node 120.

As mentioned, the control node 120 is configured to control a SIR-target for use by the radio network node 110 when operating an ILPC.

State 700

Here, before the method according to embodiments herein has begun, the radio network node 110 may be configured to manage a primary and a secondary stream. This may mean that the radio network node 110 receives the primary and secondary streams, while employing HSUPA MIMO, from the user equipment 140. Moreover, this may mean that the radio network node 110 forwards the primary and secondary streams, i.e. data packets of the primary and secondary streams, to the control node 120.

The following actions may be performed in any suitable order.

Action 701

The radio network node 110 detects a first indication of number of HARQ re-transmissions. The first indication is related to the primary stream. This action is similar to action 301.

Action 702

The radio network node 110 detects a second indication of number of HARQ re-transmissions. The second indication is related to the secondary stream. This action is similar to action 302.

Action 703

The radio network node 110 configures an Iub frame based on one or more of the first and second indication. This action is similar to action 303.

Again referring to solution A, the Iub frame may be configured based on only the first indication.

Again referring to solution B, the Iub frame may comprise a first field for indicating HSUPA MIMO in use and a second field for carrying the second indication.

Again referring to solution C, the Iub frame may comprise a fourth field, indicating number of HARQ re-transmissions, and a third field, indicating whether the fourth field relates to the primary stream or the secondary stream.

Again referring to solution D, the Iub frame may comprise a fifth field indicating whether a data packet included in the Iub frame is associated with the primary stream or the secondary stream.

Action 704

The radio network node 110 may send the Iub frame to the control node 120. This action is similar to action 304.

State 705

At this stage, after the method according to embodiments herein may have been performed, the radio network node 110 may receive an updated SIR-target to be used when the radio network node 110 operates the ILPC. This may imply that the control node 110 may have determined the updated SIR-target in action 307. Then, the control node 120 may have sent the updated SIR-target to the radio network node 110.

Figure 8:
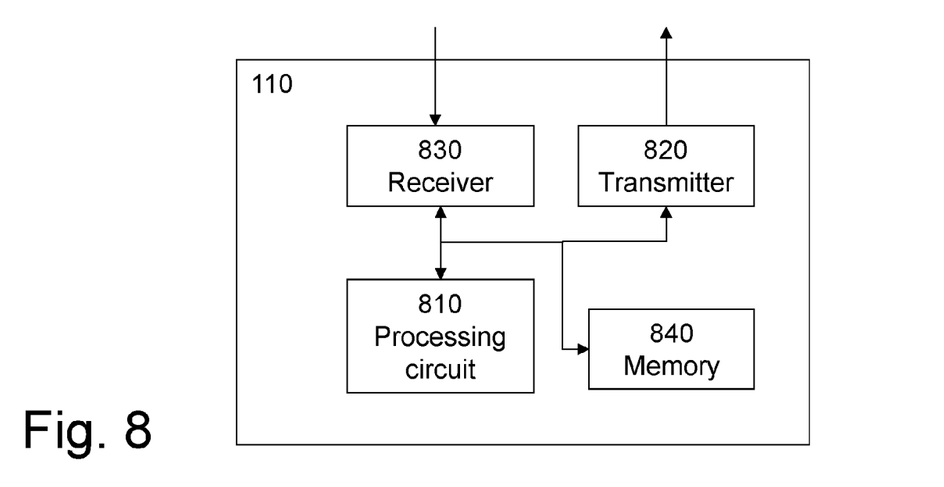
FIG. 8 is a block diagram illustrating embodiments of the radio network node.

FIG. 8 illustrates embodiments of the radio network node 110, which is configured to perform the embodiments described herein. Thus, the radio network node 110 is configured to enable OLPC performed by a control node 120. The control node 120 is configured to control a SIR-target for use by the radio network node 110 when operating an ILPC, i.e. the procedure of ILPC. The radio network node 110 is configurable to receive a primary stream and a secondary stream while employing HSUPA MIMO.

The radio network node 110 comprises a processing circuit 810 configured to perform the embodiments of the method in the radio network node 110 as illustrated in FIGS. 3 and/or 7.

The processing circuit 810 is configured to detect a first indication of number of HARQ re-transmissions. The first indication is related to the primary stream;

Moreover, the processing circuit 810 is configured to detect a second indication of number of HARQ re-transmissions. The second indication is related to the secondary stream.

Additionally, the processing circuit 810 is configured to configure an Iub frame based on one or more of the first and second indication.

The processing circuit 810 may further be configured to send the Iub frame to the control node 120.

The processing circuit 810 may be a processing unit, a processor, an application specific integrated circuit (ASIC), a field-programmable gate array (FPGA) or the like. As an example, a processor, an ASIC, an FPGA or the like may comprise one or more processor kernels. The processing circuit may comprise one or more units, such as a configuring unit, a determining unit, a detecting unit, an obtaining unit or the like in order to implement the actions described herein. The one or more units may comprise a software module or a hardware module, such as a processing unit, a processor, an application specific integrated circuit (ASIC), a field-programmable gate array (FPGA) or the like. As an example, a processor, an ASIC, an FPGA or the like may comprise one or more processor kernels.

The Iub frame may be configured based on only the first indication. This means that the processing circuit 810 may be configured to configure the Iub frame based on only the first indication.

The Iub frame may comprise a first field for indicating HSUPA MIMO in use and a second field for carrying the second indication.

The Iub frame may comprise a fourth field, indicating number of HARQ re-transmissions, and a third field, indicating whether the fourth field relates to the primary stream or the secondary stream.

The Iub frame may comprise a fifth field indicating whether a data packet included in the Iub frame is associated with the primary stream or the secondary stream.

The radio network node 110 further comprises a transmitter 820, which may be configured to send one or more of the Iub frame and other numbers, values, indications or parameters or the like described herein.

The radio network node 110 further comprises a receiver 830, which may be configured to receive one or more of the numbers, values, indications or parameters or the like.

The radio network node 110 further comprises a memory 840 for storing software to be executed by, for example, the processing circuit. The software may comprise instructions to enable the processing circuit to perform the method in the radio network node 110 as described herein in conjunction with for example FIGS. 3 and/or 7. The memory may be a hard disk, a magnetic storage medium, a portable computer diskette or disc, flash memory, random access memory (RAM) or the like. Furthermore, the memory may be an internal register memory of a processor.

Figure 9:
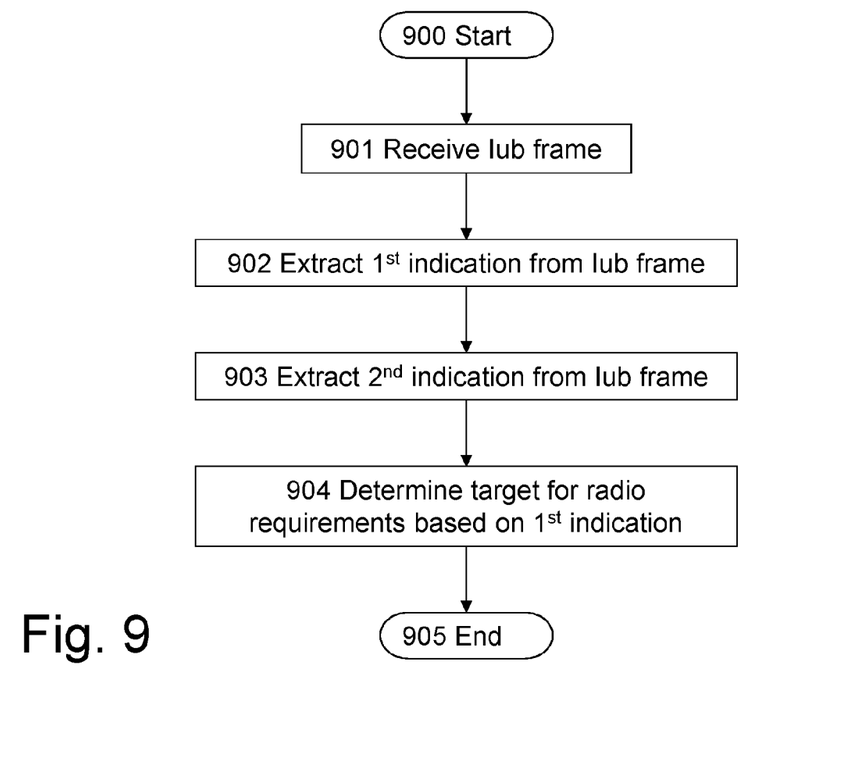
FIG. 9 is a flowchart illustrating embodiments of the method in the control node.

With reference to FIG. 9, embodiments of the method in the control node 120 are described. Actions described here are similar to the actions described in FIG. 3 as seen from the control node 120. Thus, the control node 120 performs a method for performing OLPC.

As mentioned, the control node 120 is configured to control a SIR-target for use by a radio network node 110 when operating an ILPC. The radio network node 110 handles a primary stream and a secondary stream while employing HSUPA MIMO.

State 900

At this point, before the method according to embodiments herein is started, the control node 120 may take control over one or more radio network nodes, such as the radio network node 110, for which the control node 120 will set, or determine, the SIR-target(s). As an example, the control node 120 may inform the radio network node 110 about current configuration settings, e.g. whether MIMO is used or not, indicate an appropriate SIR target, indicate a Iub frame type structure, etc.

The following actions may be performed in any suitable order.

Action 901

The control node 120 receives the Iub frame from the radio network node 110.

Again referring to solution B, the Iub frame may comprise a first field for indicating HSUPA MIMO in use and a second field for carrying the second indication.

Again referring to solution C, the Iub frame may comprise a fourth field, indicating number of HARQ re-transmissions, and a third field, indicating whether the fourth field relates to the primary stream or the secondary stream.

Again referring to solution D, the Iub frame may comprise a fifth field indicating whether a data packet included in the Iub frame is associated with the primary stream or the secondary stream.

This action is similar to action 304.

Next, at least one of the following two actions is performed.

Action 902

The control node 120 extracts, from the Iub frame, a first indication of number of HARQ re-transmissions. As mentioned, the first indication is related to the primary stream. This action is similar to action 305.

Action 903

The control node 120 extracts, from the Iub frame, a second indication of number of Hybrid Automatic Repeat reQuest "HARQ" re-transmissions. As mentioned, the second indication is related to the secondary stream.

This action is similar to action 306.

Action 904

The control node 120 determines the SIR-target based on the first indication. This action is similar to action 307.

In some examples, the control node 120 may further determine the SIR-target based on the second indication.

State 905

At this stage, the control node 120 may be said to have performed one loop of the OLPC. Hence, the control node 120 may again receive a Iub frame, as in action 901, in order to receive data, to be forwarded to an intended recipient, and possibly proceed once again with the actions above.

Figure 10:
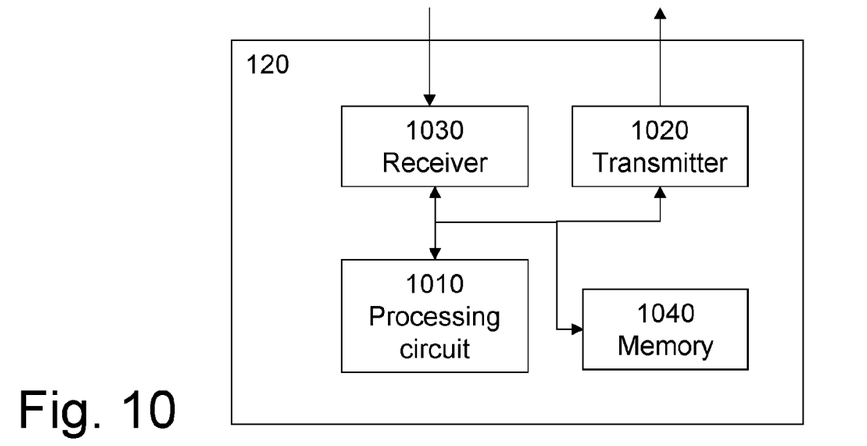
FIG. 10 is a block diagram illustrating embodiments of the control node.

FIG. 10 illustrates embodiments of the control node 120, which is configured to perform the embodiments described herein. Thus, the control node 120 is configured to perform OLPC, i.e. a procedure of OLPC. The control node 120 is configured to control an SIR-target for use by the radio network node 110 when operating an ILPC. The radio network node 110 is configurable to handle a primary stream and a secondary stream while employing HSUPA MIMO.

The control node 120 comprises a processing circuit 1010 configured to perform the embodiments of the method in the radio network node 110 as illustrated in FIGS. 3 and/or 9.

The processing circuit 1010 configured to receive a Iub frame from the radio network node 110.

Furthermore, the processing circuit is configured to at least one of: to extract, from the Iub frame, a first indication of number of HARQ re-transmissions, and to extract, from the Iub frame, a second indication of number of HARQ re-transmissions. The first indication is related to the primary stream. The second indication is related to the secondary stream. Moreover, the processing circuit 1010 further is configured to determine the SIR-target based on the first indication.

The processing circuit 1010 may further be configured to further determine the SIR-target based on the second indication.

The processing circuit 1010 may be a processing unit, a processor, an application specific integrated circuit (ASIC), a field-programmable gate array (FPGA) or the like. As an example, a processor, an ASIC, an FPGA or the like may comprise one or more processor kernels. The processing circuit may comprise one or more units, such as a configuring unit, a determining unit, a detecting unit, an obtaining unit or the like in order to implement the actions described herein. The one or more units may comprise a software module or a hardware module, such as a processing unit, a processor, an application specific integrated circuit (ASIC), a field-programmable gate array (FPGA) or the like. As an example, a processor, an ASIC, an FPGA or the like may comprise one or more processor kernels.

The Iub frame may comprise a first field for indicating HSUPA MIMO in use and a second field for carrying the second indication.

The Iub frame may comprise a fourth field, indicating number of HARQ re-transmissions, and a third field, indicating whether the fourth field relates to the primary stream or the secondary stream.

The Iub frame may comprise a fifth field indicating whether a data packet included in the Iub frame is associated with the primary stream or the secondary stream.

The control node 120 further comprises a transmitter 1020, which may be configured to send one or more of the numbers, values, indications or parameters or the like described herein.

The control node 120 further comprises a receiver 1030, which may be configured to receive one or more of the Iub frame and other numbers, values, indications or parameters or the like described herein.

The control node 120 further comprises a memory 1040 for storing software to be executed by, for example, the processing circuit. The software may comprise instructions to enable the processing circuit to perform the method in the control node 120 as described herein in conjunction with for example FIGS. 3 and/or 9. The memory may be a hard disk, a magnetic storage medium, a portable computer diskette or disc, flash memory, random access memory (RAM) or the like. Furthermore, the memory may be an internal register memory of a processor.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

UTRAN comprises two nodes, RNC and NodeB. GSM EDGE Radio Access Network (GERAN) comprises BSC and Base Transceiver Station (BTS).

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a control node, for performing Outer-Loop Power Control "OLPC", wherein the control node is configured to control an Signal-to-Interference Ratio-target, "SIR-target", for use by a radio network node when operating an Inner Loop Power Control "ILPC", wherein the radio network node handles a primary stream and a secondary stream while employing High-Speed Uplink Packet Access Multiple-Input-Multiple-Output "HSUPA MIMO", wherein the method comprises:
 receiving a Iub frame from the radio network node; wherein the method further comprises:
  extracting, from the Iub frame, a first indication of number of Hybrid Automatic Repeat reQuest "HARQ" re-transmissions, wherein the first indication is related to the primary stream; and
  extracting, from the Iub frame, a second indication of number of Hybrid Automatic Repeat reQuest "HARQ" re-transmissions, wherein the second indication is related to the secondary stream; and
 wherein the method further comprises:
  determining the SIR-target based on the first indication.

2. The method according to claim 1, wherein the Iub frame comprises a first field for indicating HSUPA MIMO in use and a second field for carrying the second indication.

3. The method according to claim 1, wherein the Iub frame comprises a fourth field, indicating number of HARQ re-transmissions, and a third field, indicating whether the fourth field relates to the primary stream or the secondary stream.

4. The method according to claim 1, wherein the Iub frame comprises a fifth field indicating whether a data packet included in the Iub frame is associated with the primary stream or the secondary stream.

5. The method according to claim 1, wherein the determining of the SIR-target further is based on the second indication.

6. A control node configured to perform Outer-Loop Power Control "OLPC", wherein the control node is configured to control an Signal-to-Interference Ratio-target, "SIR-target", for use by a radio network node when operating an Inner Loop Power Control "ILPC", wherein the radio network node is configurable to handle a primary stream and a secondary stream while employing High-Speed Uplink Packet Access Multiple-Input-Multiple-Output "HSUPA MIMO", wherein the control node comprises a processing circuit configured to:
 receive a Iub frame from the radio network node; wherein the processing circuit further is configured to:
  extract, from the Iub frame, a first indication of number of Hybrid Automatic Repeat reQuest "HARQ" re-transmissions, wherein the first indication is related to the primary stream; and extract, from the Iub frame, a second indication of number of Hybrid Automatic Repeat reQuest "HARQ" re-transmissions, wherein the second indication is related to the secondary stream; and wherein the processing circuit further is configured to determine the SIR-target based on the first indication.

7. The control node according to claim 6, wherein the Iub frame comprises a first field for indicating HSUPA MIMO in use and a second field for carrying the second indication.

8. The control node according to claim 6, wherein the Iub frame comprises a fourth field, indicating number of HARQ re-transmissions, and a third field, indicating whether the fourth field relates to the primary stream or the secondary stream.

9. The control node according to claim 6, wherein the Iub frame comprises a fifth field indicating whether a data packet included in the Iub frame is associated with the primary stream or the secondary stream.

10. The control node according to claim 6, wherein the processing circuit further is configured to further determine the SIR-target based on the second indication.

11. A method for enabling Outer-Loop Power Control "OLPC" performed by a control node, wherein the control node is configured to control a Signal-to-Interference Ratio-target, "SIR-target", for use by a radio network node when operating an Inner Loop Power Control "ILPC", wherein the radio network node handles a primary stream and a secondary stream while employing High-Speed Uplink Packet Access Multiple-Input-Multiple-Output "HSUPA MIMO", wherein the method comprises:

detecting, by the radio network node, a first indication of number of Hybrid Automatic Repeat reQuest "HARQ" re-transmissions, wherein the first indication is related to the primary stream;

detecting, by the radio network node, a second indication of number of HARQ re-transmissions, wherein the second indication is related to the secondary stream;

configuring, by the radio network node, an Iub frame based on the first and second indication;

sending, by the radio network node, the Iub frame to the control node;

extracting, by the control node, from the Iub frame, the first indication of the number of Hybrid Automatic Repeat reQuest "HARQ" re-transmissions;

extracting, by the control node, from the Iub frame, the second indication of the number of Hybrid Automatic Repeat reQuest "HARQ" re-transmissions; and determining, by the control node, the SIR-target based on the first indication.

12. The method according to claim 11, wherein the Iub frame comprises a first field for indicating HSUPA MIMO in use and a second field for carrying the second indication.

13. The method according to claim 11, wherein the Iub frame comprises a fourth field, indicating number of HARQ re-transmissions, and a third field, indicating whether the fourth field relates to the primary stream or the secondary stream.

14. The method according to claim 11, wherein the Iub frame comprises a fifth field indicating whether a data packet included in the Iub frame is associated with the primary stream or the secondary stream.

15. The method according to claim 11, wherein the determining of the SIR-target further is based on the second indication.

* * * * *